United States Patent
Niewold et al.

(10) Patent No.: US 8,409,343 B2
(45) Date of Patent: *Apr. 2, 2013

(54) ORGANIC-INORGANIC HYBRID PIGMENT COMPOSITIONS

(75) Inventors: Lori A. Niewold, Anthony, NM (US); Robyn Torres, El Paso, TX (US); Gary E. Williams, El Paso, TX (US)

(73) Assignee: Mayan Pigments, Inc., El Paso, TX (US)

( * ) Notice: Subject to any disclaimer, the term of this patent is extended or adjusted under 35 U.S.C. 154(b) by 142 days.

This patent is subject to a terminal disclaimer.

(21) Appl. No.: 12/863,558

(22) PCT Filed: Jan. 21, 2009

(86) PCT No.: PCT/US2009/031570
§ 371 (c)(1),
(2), (4) Date: Jul. 19, 2010

(87) PCT Pub. No.: WO2009/092103
PCT Pub. Date: Jul. 23, 2009

(65) Prior Publication Data
US 2010/0298482 A1    Nov. 25, 2010

Related U.S. Application Data

(60) Provisional application No. 61/021,787, filed on Jan. 17, 2008, provisional application No. 61/044,608, filed on Apr. 14, 2008.

(51) Int. Cl.
C09B 67/22    (2006.01)
C04B 14/10    (2006.01)
C04B 14/38    (2006.01)
C09B 67/00    (2006.01)
C09B 67/02    (2006.01)

(52) U.S. Cl. ........ 106/487; 106/410; 106/412; 106/413; 106/440; 106/441; 106/447; 106/453; 106/479; 106/486; 106/493; 106/494; 106/495; 106/496; 106/497; 106/498; 106/811; 524/445

(58) Field of Classification Search .......... 106/486, 106/487, 81, 811, 410, 412, 413, 440, 441, 106/447, 453, 479, 493, 494, 495, 496, 497, 106/498; 524/445
See application file for complete search history.

(56) References Cited

U.S. PATENT DOCUMENTS

| | | | |
|---|---|---|---|
| 4,381,948 A | 5/1983 | McConnell et al. | |
| 4,842,903 A | 6/1989 | Hayner | |
| 5,759,256 A | 6/1998 | Stramel | |
| 6,495,250 B1 | 12/2002 | Schacht et al. | |
| 6,503,970 B1 | 1/2003 | Valin | |
| 7,052,541 B2 | 5/2006 | Chianelli et al. | |
| 7,425,235 B2 * | 9/2008 | Chianelli et al. | 106/487 |
| 7,429,294 B2 * | 9/2008 | Chianelli et al. | 106/401 |
| 8,123,850 B2 * | 2/2012 | Niewold | 106/487 |
| 2005/0007680 A1 | 1/2005 | Naganuma et al. | |
| 2005/0207002 A1 | 9/2005 | Liu et al. | |
| 2007/0012349 A1 | 1/2007 | Gaudiana et al. | |
| 2007/0277702 A1 | 12/2007 | Chianelli et al. | |
| 2008/0031508 A1 | 2/2008 | Baloukas et al. | |
| 2008/0216711 A2 | 9/2008 | Heubach | |
| 2010/0298482 A1 | 11/2010 | Niewold et al. | |
| 2011/0113986 A1 | 5/2011 | Niewold et al. | |

FOREIGN PATENT DOCUMENTS

JP    49-005433 A  *  1/1974
JP    3-216306 A  *  9/1991

OTHER PUBLICATIONS

English translation of International Preliminary Report on Patentability and Written Opinion issued in International Application No. PCT/US2009/031570 dated Jul. 29, 2010.
United States Office Action issued in U.S. Appl. No. 12/921,998 dated Jul. 15, 2011.
United States Office Action issued in U.S. Appl. No. 12/922,013 dated Jul. 15, 2011.

* cited by examiner

*Primary Examiner* — Anthony J Green
(74) *Attorney, Agent, or Firm* — McDermott Will & Emery LLP

(57) ABSTRACT

An organic-inorganic hybrid pigment composition is provided comprising an organic pigment, an inorganic pigment, and a fibrous clay. The fibrous clay can be selected from palygorskite, sepiolite, or a combination thereof. The inorganic pigment is selected from rutile pigments, spinel pigments, bismuth vanadate pigments, cerium sulfide pigments, and combinations thereof. The organic pigment is selected from anthraquinone pigments, anthrathrone pigments, anthrapyrimidine pigments, azo pigments, azomethine pigments, quinacridone pigments, quinophthalone pigments, diketopyrrolopyrrol pigments, inanthrone pigments, isoindoline pigments, metal complex pigments, perinone pigments, perylene pigments, phthalocyanine pigments, pyranthrone pigments, pyrazolo-quinazolone pigments, thioindigo pigments, and combinations thereof.

17 Claims, 7 Drawing Sheets

— 30% Tico ™ Green 504K with 70% Milled Attagel 50 before heated

— 30% Tico ™ Green 504K with 70% Milled Attagel 50 after heated

— 30% Tico ™ Red 643 PS20 with 70% Milled Attagel 50 before heated

— 30% Tico ™ Red 643 PS20 with 70% Milled Attagel 50 after heated

US 8,409,343 B2

ORGANIC-INORGANIC HYBRID PIGMENT COMPOSITIONS

RELATED APPLICATIONS

This application is the U.S. National Phase under 35 U.S.C. § 371 of International Application No. PCT/U.S.2009/031570, filed on Jan. 21, 2009, which in turn claims the benefit of U.S. Provisional Application Ser. No. 61/021,787, filed Jan. 17, 2008 and U.S. Provisional Application Ser. No. 61/044,608, filed Apr. 14, 2008. This application discloses subject matter similar to that disclosed in U.S. Pat. Nos. 7,052,541; 7,425,235; and 7,429,294; and U.S. application Ser. No. 11/424,758, filed Jun. 16, 2006, now abandoned; and U.S. application Ser. No. 12/068,115 filed Feb. 1, 2008, now abandoned. The contents of each herein incorporated by reference in their entirety.

FIELD OF THE INVENTION

This invention relates to hybrid pigment compositions comprising organic colorants and an inorganic fibrous clay and methods of preparing such compositions.

BACKGROUND

In the scientific literature, the term Maya blue refers to a "turquoise" brilliant shade of blue that is found on murals and archaeological artifacts, for example, throughout Mesoamerica. It is described in the literature as being composed of palygorskite clay and indigo, that when mixed and heated, produce the stable brilliant blue color similar to that found in Mesoamerica. Proposed methods of preparation were performed with the intent of trying to replicate the blue color found at the historical sites and to reproduce the techniques employed by the original Maya.

H. Van Olphen, Rutherford Gettens, Edwin Littman, Anna Shepard, and Luis Torres were involved in the examination of organic/inorganic complex paint from the 1960's to the 1980's. In early studies, Littman and Van Olphen published information specifically on the synthesis of the Mayan organic/inorganic complex (Littman, *Amer. Antiquity,* 45:87-101, 1980; Littman, *Amer. Antiquity,* 47:404-408, 1982; Olphen, *Amer. Antiquity,* 645-646, 1966; Olphen, *Science,* 154:645-646, 1966). Their work did not describe the technique for making the colorant, nor explain the stability of the organic/inorganic complex. However, the results of their two decades of studies with respect to the ancient paint laid a foundation of knowledge for future investigators.

Littman synthesized indigo-attapulgite complexes and verified that his synthetic version was indistinguishable from the original pigments found in the pre-Hispanic murals and artifacts (Littman, *Amer. Antiquity,* 45:87-101, 1980; Littman, *Amer. Antiquity,* 47:404-408, 1982). The prepared samples had the same physical and chemical characteristics as the authentic Maya blue examined. Littman concluded that the remarkable stability of the attapulgite was due to the heat treatment the attapulgite received during the synthesis. Others have also synthesized compounds similar to that of Maya blue by a number of routes (Tones, *Maya Blue: How the Mayas Could Have Made the Pigment,* Mat. Res. Soc. Symp., 1988). They employed the Gettens test to determine whether the laboratory synthesis of Maya blue was indeed authentic with the same chemical resistant properties (Gettens, *Amer. Antiquity,* 27:557-564, 1962). The test was necessary because initial attempts of simply mixing the palygorskite clay produced the color of Maya blue but the mixture did not possess the same chemical properties as the original organic/inorganic complex samples.

Previous literature discussions of pH pertain to the alkaline pH required to reduce the indigo prior to contacting it with the clay (Littman, *Amer. Antiquity,* 45:87-101, 1980; Littman, *Amer. Antiquity,* 47:404-408, 1982). Moreover, there was a lack of understanding regarding the chemistry for producing stable and nontoxic paint systems by combining dyes and pigments with fibrous clays. U.S. Pat. No. 3,950,180 describes color compositions that involve cationic organic basic colored compounds complexed to alkali-treated inorganic substances.

More recently, several patents and patent applications discussed indigo and related organic dyes complexed in an ionic interaction with inorganic supports. PCT Publication No. WO 01/04216 also describes ionic interactions in color compositions, wherein organic dyes undergo ion exchange with charged inorganic clays.

U.S. Pat. No. 3,950,180 covers a method of manufacturing color compositions that include zeolite and montmorillonite. U.S. Pat. No. 5,061,290 covers a method of using indigo derivatives as a dyeing agent. U.S. Pat. No. 4,246,036 covers the method of manufacturing color compositions that are comprised of asbestos-cement. U.S. Pat. No. 4,640,862 covers color compositions that are used for coating an expanded polystyrene "drop-out" ceiling tile. U.S. Pat. No. 4,868,018 covers color compositions that are used with a mixture of epoxy resin, epoxy resin hardener, and portland cement to form a coating which can be applied to a surface to form simulated marble products. U.S. Pat. No. 4,874,433 covers a method for encapsulating color compositions in and/or to a zeolite. U.S. Pat. No. 5,574,081 covers a method of manufacturing waterborne clay-containing emulsion paints with improved application performance using color compositions. U.S. Pat. No. 5,972,049 covers the method of manufacturing and using color compositions to form dye carriers used in the dyeing process for hydrophobic textiles. U.S. Pat. No. 5,993,920 covers the method of manufacturing and using color compositions with stone powder and/or cement powder, fine sawdust and/or the heart of a kaoliang stalk and other materials to form an incombustible artificial marble. U.S. Pat. No. 6,339,084 covers the method of manufacturing thiazine-indigo pigments. U.S. Pat. No. 6,402,826 covers the method and manufacturing of color compositions for paper coating.

U.S. Pat. Nos. 7,052,541 and 7,429,294 describe color compositions comprising neutral indigo derivative pigments and dyes complexed to the surface of inorganic clays. These materials are useful as paints and coatings for artistic and industrial purposes, including use in cements, plastics, papers and polymers. Upon grinding and heating the organic and inorganic component as solid mixtures or in aqueous solutions, the resulting color compositions have unprecedented stability relative to the original starting materials. U.S. Pat. No. 7,425,235 describes the use of similar starting materials in methods that rely on UV-light for preparing color compositions.

Organic-inorganic titanate hybrid pigments have been developed that are non-bleeding, have good light-fastness, exhibit maximum gloss, opacity, and strength. These pigments are organic-inorganic titanate hybrids comprising organic colorants attached to the surface of a titanate carrier, as disclosed by U.S. Patent Publication No. 2008/0216711, incorporated by reference in its entirety. Organic-inorganic titanate hybrid pigments are available as Tico™ pigments from Heubach GmbH. However, certain Tico™ pigments are not suitable for use in high temperature applications, such as in nylon molding compositions.

SUMMARY

In certain embodiments of the present disclosure, an organic-inorganic hybrid pigment composition is provided comprising an organic pigment, an inorganic pigment, and a fibrous clay. The fibrous clay can be selected from palygorskite, sepiolite, or a combination thereof.

The inorganic pigment can be selected from the group consisting of rutile pigments, spinel pigments, bismuth vanadate pigments, cerium sulfide pigments, and combinations thereof. In certain embodiments, the inorganic pigment is a rutile-based pigment. In certain embodiments, the rutile-based pigment is chromium antimony titanate yellow or antimony nickel titanate yellow.

The organic pigment can be selected from the group consisting of anthraquinone pigments, anthrathrone pigments, anthrapyrimidine pigments, azo pigments, azomethine pigments, quinacridone pigments, quinophthalone pigments, diketopyrrolopyrrol pigments, inanthrone pigments, isoindoline pigments, metal complex pigments, perinone pigments, perylene pigments, phthalocyanine pigments, pyranthrone pigments, pyrazolo-quinazolone pigments, thioindigo pigments, and combinations thereof.

In certain embodiments of the present disclosure, the composition further comprising a thermoplastic or thermoset polymer. In certain embodiments, the polymer is a polyamide, polyolefin, polycarbonate, polyester, polysulfone, polyether, or epoxy.

In certain embodiments of the present disclosure, the composition comprises a total amount of the organic pigment and inorganic pigment in a range of 0.01 wt. % to about 75 wt. % based on the total weight of the hybrid pigment composition. In certain embodiments, the composition comprises a total amount of the organic pigment and inorganic pigment in a range of 1.0 wt. % to about 50 wt. % based on the total weight of the hybrid pigment composition. In certain embodiments, the composition comprises a total amount of the organic pigment and inorganic pigment in a range of 10 wt. % to about 35 wt. % based on the total weight of the hybrid pigment composition.

In certain embodiments of the present disclosure, an organic-inorganic hybrid pigment composition comprises Pigment Yellow 151, Pigment Red 254, or a combination thereof, and a fibrous clay. The fibrous clay can be a palygorskite, sepiolite, or a combination thereof.

In certain embodiments of the present disclosure, the composition comprises from about 0.01 wt. % to about 75 wt. % Pigment Yellow 151, Pigment Red 254, or a mixture of Pigment Yellow 151 and Pigment Red 254 mixed with fibrous clay based on the total weight amount of the pigment and the clay. In certain embodiments, the composition comprises a total amount of the pigment(s) in a range of 1.0 wt. % to about 50 wt. % based on the total weight of the hybrid pigment composition. In certain embodiments, the composition comprises a total amount of the pigment(s) in a range of 10 wt. % to about 35 wt. % based on the total weight of the hybrid pigment composition.

In certain embodiments of the present disclosure, the composition further comprises a thermoplastic or thermoset polymer. In certain embodiments, the polymer is a polyamide, polyolefin, polycarbonate, polyester, polysulfone, polyether, or epoxy.

In certain embodiments of the present disclosure, a method of forming an organic-inorganic hybrid pigment composition is provided, comprising providing an organic-inorganic hybrid pigment and a fibrous clay, and mixing the organic-inorganic hybrid pigment with the fibrous clay. In certain embodiments, the method further comprises grinding the fibrous clay, and mixing the ground clay with the organic-inorganic hybrid pigment. In certain other embodiments, the method further comprises grinding the organic-inorganic hybrid pigment, and mixing the ground organic-inorganic hybrid pigment with the clay. In certain other embodiments, the method further comprises grinding the hybrid pigment and clay together after mixing the organic-inorganic hybrid pigment with the clay.

In certain embodiments, the method further comprises heating the fibrous clay and organic-inorganic hybrid pigment to a temperature of about 90° C. to about 400° C. for about 10 minutes to about 24 hours to react the organic-inorganic hybrid pigment with the fibrous clay. In certain embodiments, the fibrous clay and organic-inorganic hybrid pigment are heated to a temperature of about 150° C. to about 170° C. In certain embodiments, the fibrous clay and organic-inorganic hybrid pigment are heated for about 1 hour to about 9 hours. In certain embodiments, the method further comprises adding a thermoplastic or thermoset polymer to the composition.

In certain embodiments of the present disclosure, a method of forming an organic-inorganic hybrid pigment composition is provided, comprising providing an organic pigment selected from the group consisting of Pigment Yellow 151, Pigment Red 254, or a combination thereof, and a fibrous clay; and mixing the organic pigment with the fibrous clay. Certain embodiments of the present disclosure further comprise grinding the fibrous clay, and mixing the ground clay with the organic pigment. In certain embodiments, the method further comprises grinding the pigment, and mixing the ground pigment with the clay. In certain embodiments, the method further comprises grinding the pigment and clay together after mixing the pigment with the clay. In certain embodiments, the fibrous clay and pigment are heated to a temperature of about 90° C. to about 400° C. for about 10 minutes to about 24 hours to react the pigment with the fibrous clay. In certain embodiments, the method further comprises adding a thermoplastic or thermoset polymer to the composition.

According to certain embodiments of the present disclosure, organic-inorganic titanate hybrids, such as a Tico™ pigments, are reacted with a fibrous clay to create a novel hybrid pigment. Organic-inorganic titanate-clay hybrid pigment compositions exhibit excellent chemical and physical properties. According to the present disclosure, reacting an organic-inorganic titanate hybrid pigment with clay produces a hybrid pigment with extensive properties and a unique color space not obtainable by organic-inorganic titanate pigments, such as Tico™ pigments. For example, organic-inorganic titanate-clay hybrid pigments provide useful pigments for high temperature applications, such as coloring Nylon 6 or Nylon 6,6.

According to certain embodiments of the present disclosure, organic pigments, such as Pigment Yellow 151 or Pigment Red 254, are reacted on a fibrous clay to create a novel organic-inorganic pigment exhibiting excellent chemical and physical properties. According to the present disclosure, reacting Pigment Yellow 151 or Pigment Red 254 with clay produces a pigment with extensive properties and a unique color space not obtainable by using the pigments alone. For example, organic-clay hybrid pigments provide useful pigments for high temperature applications, such as colored Nylon 6 and Nylon 6,6.

DETAILED DESCRIPTION

Figure 1:
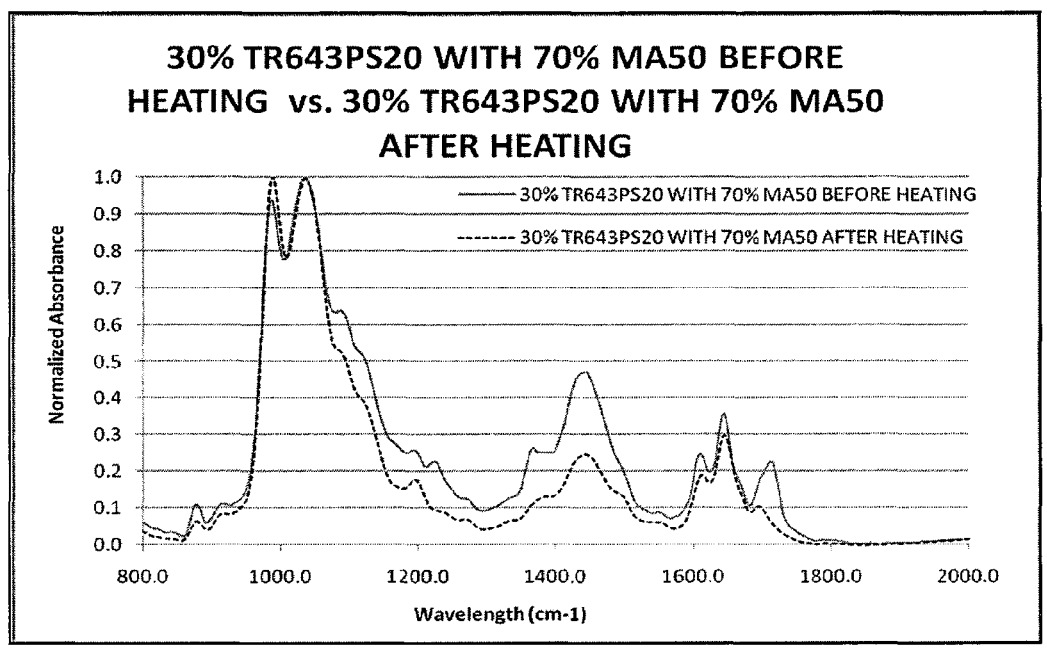
FIG. 1 are infrared spectra of embodiments according to the present disclosure comprising Tico™ Red 643PS20 and milled Attagel 50 palygorskite.

An organic-inorganic titanate pigment, such as Tico™ pigment, is reacted with the palygorskite and sepiolite clays. Samples were prepared with a blender, coffee grinder, or mortar and pestle. Once made, the samples were heated in a laboratory static oven at around 150° C. to 170° C. to react the organic-inorganic titanate with the fibrous clay. $L^*$, $a^*$, $b^*$ values were taken before and after heating of the material to determine whether a color change had occurred. Samples were also molded in a high melting temperature nylon to verify the improvement in heat stability.

Inorganic pigments within the scope of the present disclosure include: rutile pigments, spinel pigments, bismuth vanadate pigments, cerium vanadate pigments, and combinations thereof. Rutile pigments within the scope of the present disclosure include: Pigment Yellow 53, Pigment Yellow 157, Pigment Yellow 159, Pigment Yellow 160, Pigment Yellow 161, Pigment Yellow 162, Pigment Yellow 163, Pigment Yellow 164, Pigment Yellow 189, Pigment Brown 24, Pigment Brown 29, Pigment Brown 33, Pigment Brown 37, and Pigment Brown 40. Spinel pigments within the scope of the present disclosure include: Pigment Yellow 119, Pigment Brown 33, Pigment Brown 34, Pigment Brown 35, Pigment Brown 39, Pigment Blue 28, Pigment Blue 36, Pigment Blue 72, Pigment Green 26, Pigment Green 50. Bismuth vanadate pigments within the scope of the present disclosure include Pigment Yellow 184. Cerium sulfide pigments within the scope of the present disclosure include Pigment Orange 75 and Pigment Red 265.

Organic pigments within the scope of the present disclosure include: anthraquinone pigments, anthrathrone pigments, anthrapyrimidine pigments, azo pigments, azomethine pigments, quinacridone pigments, quinophthalone pigments, diketopyrrolopyrrol pigments, inanthrone pigments, isoindoline pigments, metal complex pigments, perinone pigments, perylene pigments, phthalocyanine pigments, pyranthrone pigments, pyrazolo-quinazolone pigments, thioindigo pigments, and combinations thereof. Anthraquinone pigments within the scope of the present disclosure include Pigment Yellow 147 and Pigment Yellow 199. Anthrathrone pigments within the scope of the present disclosure include Pigment Red 168. Anthrapyrimidine pigments within the scope of the present disclosure include Pigment Yellow 108. Azo pigments within the scope of the present disclosure include: Pigment Yellow 3, Pigment Yellow 12, Pigment Yellow 13, Pigment Yellow 14, Pigment Yellow 62, Pigment Yellow 74, Pigment Yellow 83, Pigment Yellow 93, Pigment Yellow 95, Pigment Yellow 120, Pigment Yellow 151, Pigment Yellow 154, Pigment Yellow 168, Pigment Yellow 175, Pigment Yellow 180, Pigment Yellow 181, Pigment Yellow 191:1, Pigment Yellow 194, Pigment Orange 5, Pigment Orange 13, Pigment Orange 34, Pigment Orange 36, Pigment Orange 62, Pigment Orange 64, Pigment Orange 67, Pigment Orange 72, Pigment Red 1, Pigment Red 2, Pigment Red 3, Pigment Red 4, Pigment Red 5, Pigment Red 23, Pigment Red 48:1, Pigment Red 48:2, Pigment Red 48:4, Pigment Red 49, Pigment Red 49:1, Pigment Red 51:1, Pigment Red 52:1, Pigment Red 53, Pigment Red 53:1, Pigment Red 57:1, Pigment Red 58:2, Pigment Red 58:4, Pigment Red 112, Pigment Red 144, Pigment Red 148, Pigment Red 166, Pigment Red 176, Pigment Red 184, Pigment Red 187, Pigment Red 214, Pigment Red 220, Pigment Red 221, Pigment Red 251, Pigment Red 262, Pigment Brown 23, and Pigment Brown 25. Azomethine pigments within the scope of the present disclosure include Pigment Yellow 129. Quinacridone pigments within the scope of the present claims include: Pigment Orange 48, Pigment Orange 49, Pigment Red 42, Pigment Red 122, Pigment Red 202, Pigment Red 206, and Pigment Violet 138. Quinophthalone pigments within the scope of the present disclosure include Pigment Yellow 138. Diketopyrrolopyrrol pigments within the scope of the present disclosure include Pigment Orange 71, Pigment Orange 73, Pigment Red 254, Pigment Red 255, Pigment Red 264, Pigment Red 270, and Pigment Red 272. Inanthrone pigments within the scope of the present disclosure include Pigment Blue 60 and Pigment Blue 64. Isoindoline pigments within the scope of the present disclosure include: Pigment Yellow 109, Pigment Yellow 110, Pigment Yellow 139, Pigment Yellow 173, Pigment Yellow 185, Pigment Orange 61, Pigment Orange 69, and Pigment Red 260. Metal complex pigments within the scope of the present disclosure include: Pigment Yellow 117, Pigment Yellow 150, Pigment Yellow 153, and Pigment Yellow 177. Perinone pigments within the scope of the present disclosure include Pigment Orange 43 and Pigment Red 194. Perylene pigments within the scope of the present disclosure include: Pigment Red 123, Pigment Red 149, Pigment Red 178, Pigment Red 179, Pigment Red 190, and Pigment Red 224. Phthalocyanine pigments within the scope of the present disclosure include Pigment Blue 15, Pigment Blue 15:1, Pigment Blue 15:2, Pigment Blue 15:3, Pigment Blue 15:4, Pigment Blue 15:6, Pigment Blue 16, and Pigment Green 7. Pyranthrone pigments within the scope of the present claims include Pigment Orange 51 and Pigment Red 216. Pyrazolo-quinazolone pigments within the scope of the present disclosure include Pigment Orange 67 and Pigment Red 251. Thioindigo pigments within the scope of the present disclosure include Pigment Red 88.

Clays within the scope of the present disclosure include fibrous clays. In certain embodiments, the fibrous clays include palygorskite, sepiolite, and a combination thereof.

In certain embodiments of the present disclosure, the pigment and clay are heated to react the pigment with the clay. In certain embodiments, the pigment and clay are heated to a temperature range of about 90° C. to 400° C. for about 10 minutes to about 24 hours. In certain embodiments, the pigment and the fibrous clay are heated to a temperature of about 120° C. to about 300° C. In certain embodiments, the pigment and fibrous clay are heated to a temperature of about 150° C. to about 170° C. In certain embodiments, the pigment and fibrous clay are heated for about 1 hour to about 9 hours. In certain embodiments, the pigment and fibrous clay are heated for about 4 hours to about 6 hours.

In certain embodiments of the present disclosure, the fibrous clay is ground and then the ground clay is mixed with the pigment. In other embodiments, the pigment is ground prior to mixing with the clay. In other embodiments, the pigment and clay are mixed together and then the pigment and clay are ground together. The pigment and/or clay can be ground using a mortar and pestle, kitchen blender, or coffee grinder.

Tico™ titanate pigments, available from Heubach GmbH, can be used in the compositions and methods disclosed herein. Tico™ pigments that can be used in the compositions and methods disclosed herein include the following:

Tico™ Pigments Used in Paints and Coatings:
Tico™ Yellow TY588, Tico™ Yellow TY591, Tico™ Yellow TY594, Tico™ Yellow TY597, Tico™ Yellow TY622, Tico™ Yellow TY623, Tico™ Orange TO640, Tico™ Red TR642, Tico™ Red TR644, Tico™ Red TR655, Tico™ Red TR670, and Tico™ Green TG514.

Tico™ Pigments Used in Plastics:
Tico™ Yellow TY588K, Tico™ Yellow TY593K, Tico™ Yellow TY599K, Tico™ Yellow TY610K, Tico™ Orange TO636K, Tico™ Red TR643K, Tico™ Red 643PS20, Tico™ Red TR655K, Tico™ Red TR670K, and Tico™ Green 504K.

When a mixture of certain organic-inorganic hybrid pigments, such as Tico™ pigments, with palygorskite or sepiolite clay is prepared, a color change is observed upon heating indicating an unexpected chemical reaction occurred.

The organic-inorganic hybrid pigment can be used to color polymers. In certain embodiments of the present disclosure, the composition further comprises a thermoplastic or thermoset polymer. In certain embodiments, the polymer includes polyamides, polyolefins, polycarbonates, polyesters, polysulfones, polyethers, and epoxies. In certain embodiments, the polymer is a polyamide, such as Nylon 6 or Nylon 6,6.

Examples 1-7

The following samples listed in Table 1 were prepared and heated in an oven at 170° C. for 6 hours and the color changes were recorded. Samples were made with 20 wt. % organic-inorganic titanate hybrid pigment or pigment and 80 wt. % milled MinTech 325A grade palygorskite (M325) based on 100 wt. % of the sample. The samples were made using a coffee grinder to grind the pigment and the clay together. The ground pigment and clay were subsequently heated in a static oven at 170° C. for 6 hours.

TABLE 1

Color Changes of Pigments When Reacted with 80 wt. % Milled Mintech 325A Palygorskite Clay

| Example | Pigment | | L* | a* | b* | ΔE |
|---|---|---|---|---|---|---|
| 1 | Tico ™TR655K | Unheated | 47.51 | 43.42 | 23.42 | 7.74 |
| | | Heated | 54.52 | 40.15 | 23.27 | |
| 2 | Tico ™TY610K | Unheated | 77.07 | 9.63 | 54.92 | 3.95 |
| | | Heated | 79.25 | 6.74 | 53.35 | |
| 3 | Tico ™TY593K | Unheated | 80.91 | −0.64 | 60.1 | 3.7 |
| | | Heated | 80.85 | −1.68 | 56.55 | |
| 4 | Tico ™TY597 | Unheated | 78.24 | 9.09 | 53.56 | 6.26 |
| | | Heated | 75.19 | 5.53 | 49.41 | |
| 5 | Pigment Red 254 | Unheated | 49.64 | 47.82 | 25.4 | 5.94 |
| | | Heated | 45.87 | 43.66 | 23.45 | |

TABLE 1-continued

Color Changes of Pigments When Reacted with 80 wt. % Milled Mintech 325A Palygorskite Clay

| Example | Pigment | | L* | a* | b* | ΔE |
|---|---|---|---|---|---|---|
| 6 | Pigment Brown 24 | Unheated | 72.37 | 13.87 | 37.46 | 2.09 |
| | | Heated | 74.09 | 12.83 | 36.88 | |
| 7 | Pigment Yellow 151 | Unheated | 82 | −2.22 | 59.91 | 7.41 |
| | | Heated | 80.41 | −1.35 | 52.72 | |

The L*a*b* data were taken of each sample prior to and after heating and the values are shown in the table above. The ΔE was calculated between the unheated sample and the heated sample. CIE L*a*b* (CIELAB) is the most complete color model used conventionally to describe all the colors visible to the human eye. The three basic coordinates represent the lightness and color being measured: L* is related to lightness (L*=0 yields black and L*=100 indicates white), a* measures red and green hue (a*=negative values indicates green and a*=positive values indicates red), and b* measures yellow and blue hue (b*=negative values indicates blue and b*=positive values indicates yellow). The relative perceptual differences between any two colors in L*a*b* can be approximated by taking the Euclidean distance (ΔE), between them. The ΔE is given as a numerical value and is used to measure a change in color. The larger the ΔE, the larger the color change. The Tico™ pigments when reacted with the inorganic clay all changed color significantly because they are all greater than 1. Any ΔE greater than 1 is a color change visible to the human eye. The individual pigment components that make up some of these Tico™ pigments also changed color. For example, Pigment Yellow 151 and Pigment Red 254 produced a greater change in color than Pigment Brown 24. Although the Pigment Brown 24 (inorganic component) did not change color as drastically as the organic components, it appears to still have reacted with the clay to produce a final pigment with unique properties and unique color spaces/spectra.

Samples of 100 wt. % Tico™ TR655, and 20 wt. % Tico™ TR655 reacted on 80 wt. % palygorskite clay were molded to determine if heat stability was improved by reacting the Tico™ pigment with clay. When molded in Nylon 6,6, the sample of Tico™ TR655 degraded and changed color throughout the molding run, whereas, the Tico™ TR655 that was reacted with palygorskite clay did not change color and maintained its color during high temperature molding. Thus, hybrid pigments according to the present disclosure, provide improved properties once reacted with the clay over those obtained using the Tico™ pigment alone.

Examples 8 and 9

Samples were made with 30 wt. % organic-inorganic titanate pigment and 70 wt. % milled Attagel 50 palygorskite (MA50) based on a 100 wt. % of the sample. The samples were made by grinding the pigment and clay together using a mortar and pestle, and heating in a static oven at 150° C. for 1 hour.

Example 8 used Tico™ TR643SP20 organic-inorganic titanate hybrid pigment and milled Attagel 50 palygorskite clay. Tico™ TR643SP20 comprises Pigment Brown 24, Pigment Yellow 53, and Pigment Red 254.

CAS Registry Number: 68186-90-3
Common Name: C.I. Pigment Brown 24
Formula: $Cr_2O_3$, $Sb_2O_3$, $TiO_2$

C.I. PIGMENT BROWN 24, (CHROME ANTIMONY TITANIUM BUFF RUTILE)

Structural Formula Complex inorganic colored pigment based on titanium oxide; in the rutile lattice, titanium ions are partially replaced by chromium (III) and antimony (V) ions.

CAS Registry Number: 8007-18-9

Common Name: C.I. Pigment Yellow 53

Chemical Name:

Antimony nickel titanium oxide yellow

Structural Formula Complex inorganic colored pigment based on titanium oxide; in the rutile lattice, titanium ions are partially replaced by nickel (II) and antimony (V) ions.

Formula: (Ti, Ni, Sb) O

CAS Registry Number: 84632-65-5

Common Name: Pigment Red 254

Chemical Name:

Cromophtal DPP Red BP

C.I. PIGMENT RED 254, (PYRROL[3,4-C]PYRROLE-1,4-DIONE, 3,6-BIS(4-CHLOROPHENYL)-2,5-DIHYDRO-)

Structure:

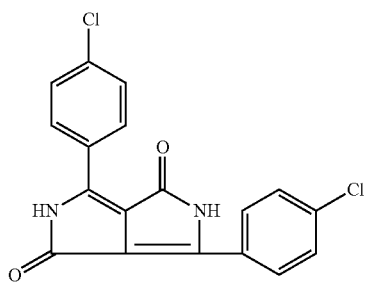 [SMILES: O=C1NC(c2ccc(Cl)cc2)=C2C(=O)NC(c3ccc(Cl)cc3)=C12]

Formula $C_{18}H_{10}Cl_2N_2O_2$

Example 9 used Tico™ TG504K organic-inorganic titanate hybrid pigment and milled Attagel 50 palygorskite clay. Tico™ TG504K is composed of Pigment Yellow 53 and Pigment Green 7.

CAS Registry Number: 8007-18-9

Common Name: C.I. Pigment Yellow 53

Chemical Name:

Nickel antimony, titanium yellow rutile

Nickel antimony titanate yellow

Structural Formula Complex inorganic colored pigment based on titanium oxide; in the rutile lattice, titanium ions are partially replaced by nickel (II) and antimony (V) ions.

Formula: (Ti, Ni, Sb) O

CAS Registry Number: 1328-53-6

Common Name: C.I. PIGMENT GREEN 7 (9CI)

Chemical Name:

PHTHALOCYANINE GREEN (PICCS)

COPPER PHTHALOCYANINE GREEN-1

Structure:

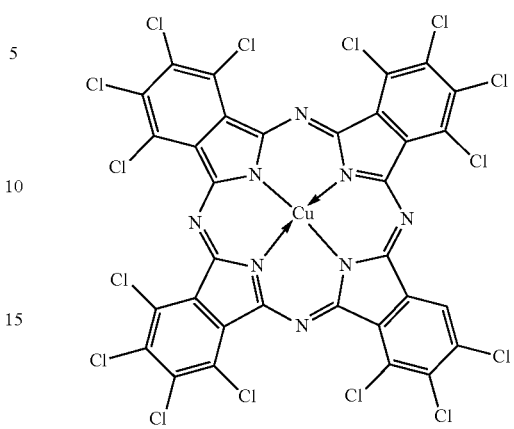

Formula: $C_{32}Cl_{16}CuN_8$

Figure 2:
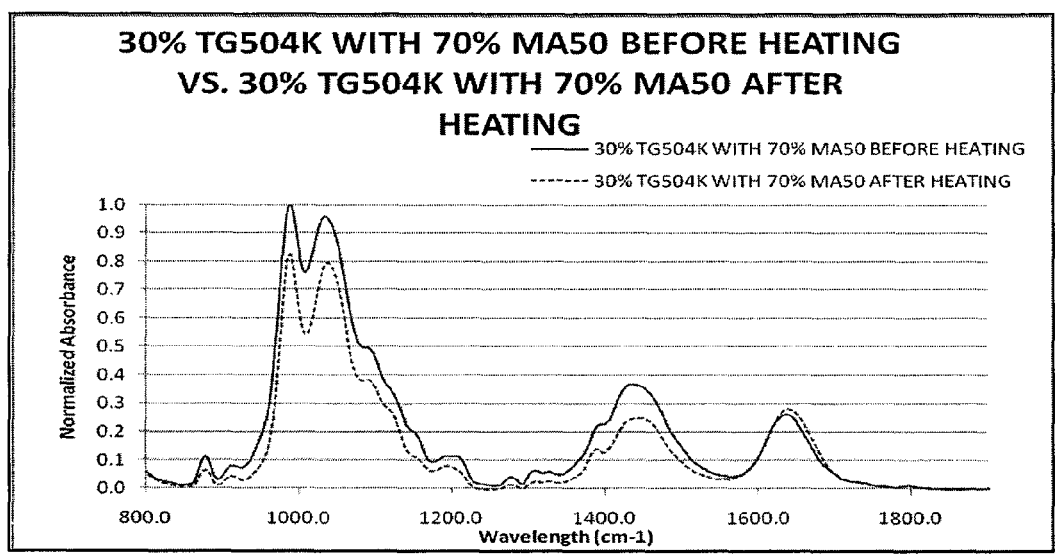
FIG. 2 are infrared spectra of embodiments according to the present disclosure comprising Tico™ Green 504K and milled Attagel 50 palygorskite.

FIG. 1 illustrates infrared spectra of Example 8 before and after heating for an hour at 150° C. FIG. 2. illustrates infrared spectra of Example 9 before and after heating for an hour at 150° C. The peak area of particular interest in FIGS. 1 and 2 is the 981 $cm^{-1}$-1033 $cm^{-1}$ range because these peaks represent the Si—O—Si bond vibrations within the palygorskite clay and any broadening or shifting of these peaks may suggest their perturbation due to the binding of a pigment onto the clay's surface. After heating either the TR643PS20 or the TG504K with the clay, there is a subtle shift in the frequencies of the peaks in this range. It is believed that as the system is heated, some of the surface water and coordinated water of the palygorskite are eliminated and thus provide a hydrogen or hydroxyl group that is now available for interaction with the dye or pigment such as TG504K. Interaction of the dye or pigment with the clay surface leads to an enhanced property profile of the final hybrid pigment, including better lightfastness and chemical resistance. Additionally, there is often an increase in thermal stability and once either the TR643PS20 or the TG504K are heated with the clay, the final hybrid colorants exhibit stability in nylon resin. The TR643PS20 or the TG504K pigments, however, do not exhibit this stability if not heated with the clay.

Figure 3:
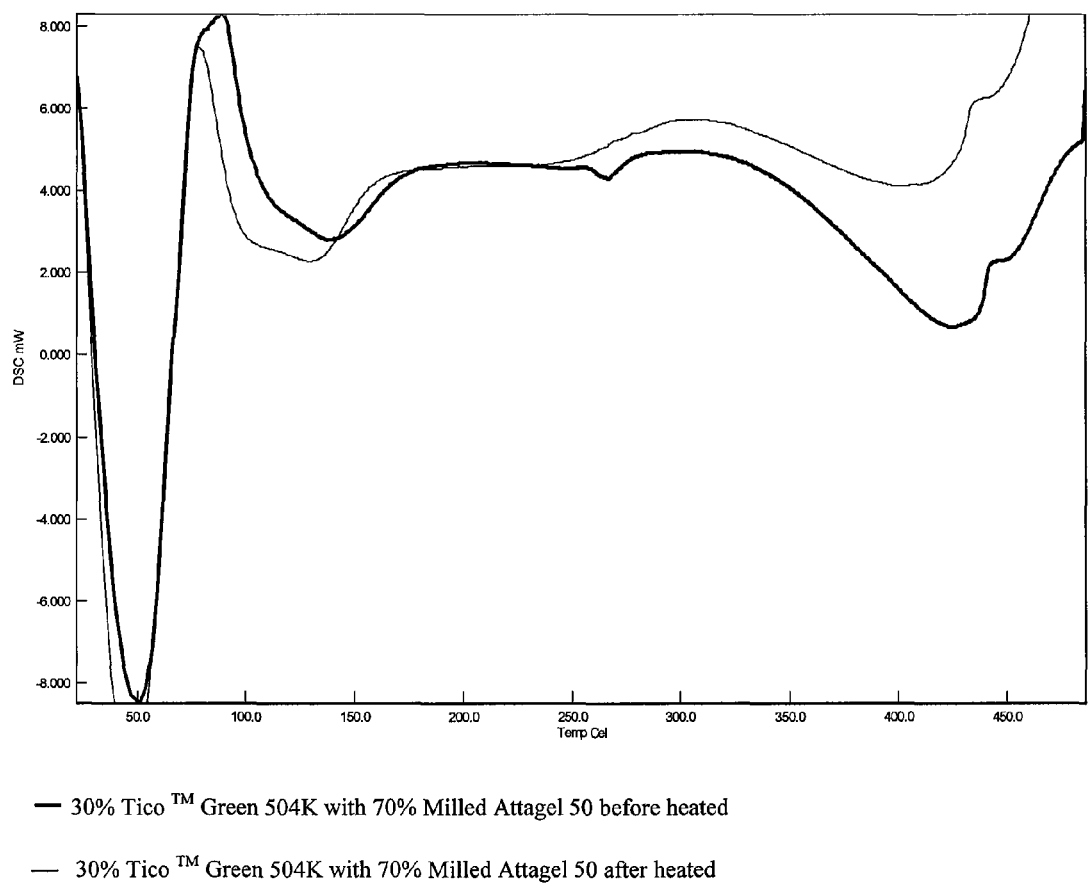
FIG. 3 are differential scanning calorimetry curves of embodiments according to the present disclosure comprising Tico™ Green 504K and milled Attagel 50 palygorskite.
Figure 4:
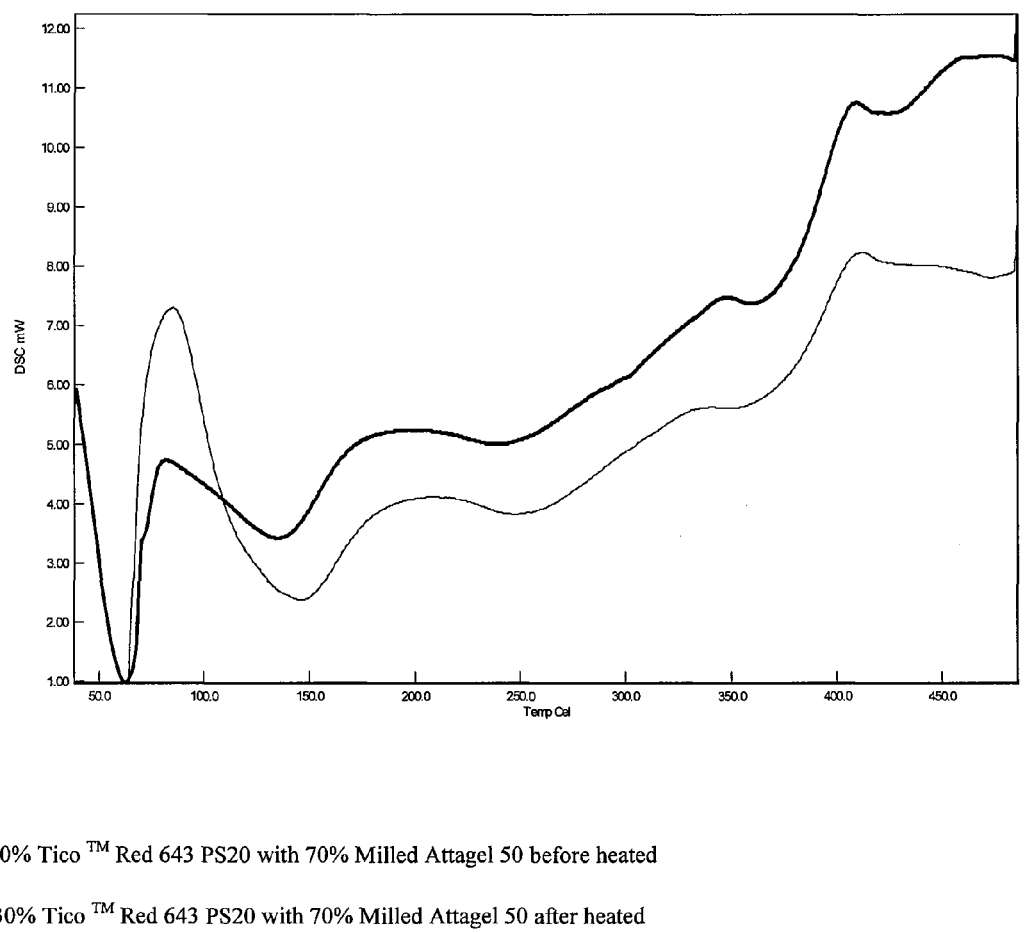
FIG. 4 are differential scanning calorimetry curves of embodiments according to the present disclosure comprising Tico™ Red 643 PS20 and milled Attagel 50 palygorskite.

FIG. 3 illustrates differential scanning calorimetry (DSC) curves of Example 9 before and after heating and FIG. 4 illustrates differential scanning calorimetry curves of Example 8 before and after heating. Table 2 contains the explanatory and supporting data for the DSC graphs of FIGS. 3 and 4. The peaks in the DSC curves are explained in terms of their enthalpy changes. The enthalpy is derived from the area under the endothermic or exothermic peak for a given temperature range. Example 8 shows a decrease in enthalpy after heating. However, the peak area is also decreased. This data suggests that once the TG504K is heated with the clay, there is much less water released from the clay during the DSC testing. It is believed this is likely because the TG504K already reacted with these surface available sites.

In Example 9, however, the enthalpy between the unheated and heated sample increases, and the peak area temperature range also increases. This is believed to be due to one of the components of the TR643PS20 being an organic red pigment, pigment red 254. The organic red pigment has many more functional groups such as carbonyls that can also interact at the clay surface. The mixture of inorganic and organic pigments that comprise the TR643PS20 can lead to a larger temperature range of which is affected during the heating process since either component would kinetically react with the clay at a different rate.

TABLE 2

DSC Data from FIGS. 3 and 4.

| Example | Before/After Heat | Tico/Composition (%) | Clay/Composition (%) | ΔH (mJ/mg) | Peak Temperature (° C.) |
|---|---|---|---|---|---|
| 8 | Before | Red 643PS20/30% | MA50/70% | 23.14 | 82.1-169.6 |
| 8 | After | Red 643PS20/30% | MA50/70% | 67.5164 | 84.9-192.1 |
| 9 | Before | Green 504K/30% | MA50/70% | 74.6633 | 89.0-176.6 |
| 9 | After | Green 504K/30% | MA50/70% | 68.6938 | 78.3-161.5 |

Examples 10 and 11

Yellow Pigment 151, a monoazo pigment with a structure as shown below, was used in Example 10.

C.I. Generic Name: C.I. Pigment Yellow 151

| C.I. Constitution Number | C.I. 13980 |
|---|---|
| Chemical class | Monoazo |
| Shade | Yellow |
| Discoverer | |
| First product | Hostaperm Yellow H4G |
| CAS Number | 31837-42-0 |
| EC Number | 250-830-4 |

Pigment Red 254, a diketopyrrolopyrrol (aminoketone) pigment with a structure as shown below, was used in Example 11.

C.I. Generic Name: C.I. Pigment Red 254

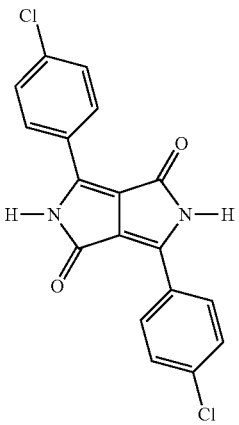 [SMILES: O=C1NC(c2ccc(Cl)cc2)=C2C(=O)NC(c3ccc(Cl)cc3)=C12]

| C.I. Constitution Number | C.I. 56110 |
|---|---|
| Chemical class | Aminoketone |
| Shade | Bright red |
| Discoverer | |
| First product | Irgazin DPP Red BO |
| CAS Number | 84632-65-5 |
| EC Number | 401-540-3 |

Pigment Yellow 151 (PY151) and Pigment Red 254 (PR 254) produced a great change in color, changing to orange when mixed with the clay and heated.

Example 10

Figure 5:
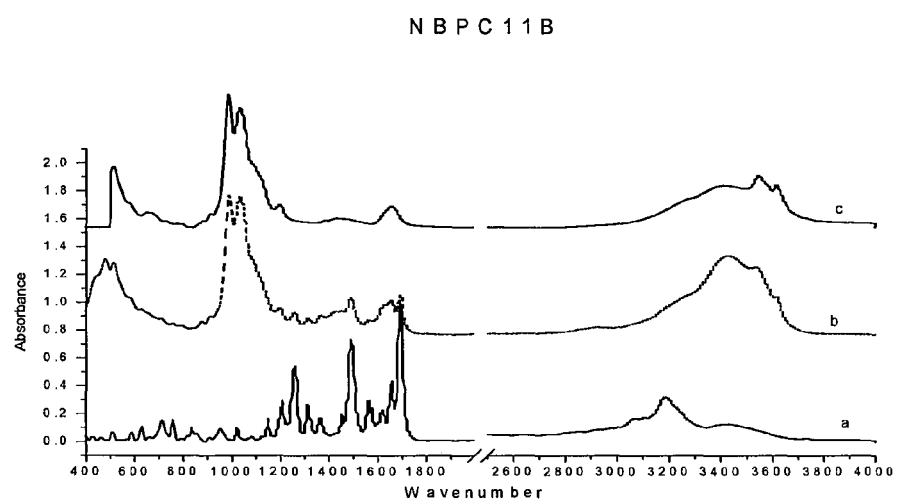
FIG. 5 are Fourier Transform infrared spectra of embodiments according to the present disclosure comprising Pigment Yellow 151.

A 1.00 g of sample of PY151 (Capelle Lysopac Yellow 5110P) was added to 9.0 grams of Milled Attagel 50 clay (MAt50) palygorskite. The mixture was ground in a Black and Decker upright coffee grinder for 5 minutes. The mixture was then placed in a preheated oven at 150° C. for 4 hours to create sample No. NBPC11B. The mixture was cooled and subjected to FT-IR (Fourier Transform-Infrared) spectroscopy, as shown in FIG. 5. In FIG. 5, curve a denotes pure PY151; curve b denotes Sample No. NBPC11B (10 wt. % yellow 151 reacted with 90 wt. % MAt50 based on the total weight of the pigment and clay); and curve c denotes MAt50 clay. Many of the peaks in [b] are reduced, particularly in the 1200-1800 cm$^{-1}$ wavenumber range, indicative of the possible binding of the PY151 to the clay. The peaks in this range are likely due to C—H, C═O, and the C═C vibrations of the pigment that are perturbed when the organic functional groups interact chemically with the clay.

Example 11

A 1.00 gram sample of Pigment Red 254 (PR254) was added to 9.0 grams of Milled Attagel 50 palygorskite clay.

Figure 6:
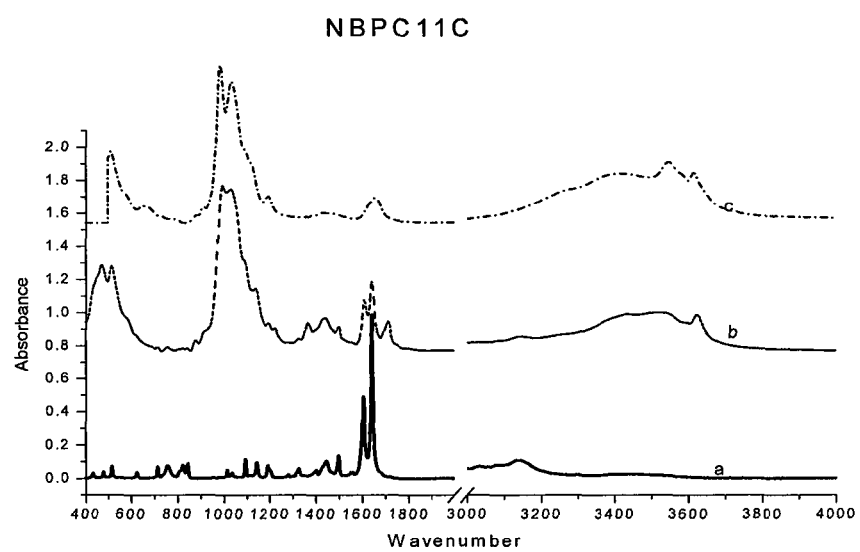
FIG. 6 are Fourier Transform infrared spectra of embodiments according to the present disclosure comprising Pigment Red 254.

The mixture was ground for 5.0 minutes in a Black and Decker upright coffee grinder. The mixture was then placed in a preheated oven unit at 150° C. for 4 hours to form Sample No. NBPC11C. The mixture was then cooled and subjected to FT-IR spectroscopy, as shown in FIG. 6. In FIG. 6, curve a denotes pure PR254; curve b denotes Sample No. NBPC11C (10 wt. % PR254 reacted with 90 wt. % MAt50 based on the total weight of the pigment and the clay); and curve c denotes MAt50 clay. As seen in FIG. 6, it appears that similar peaks are affected in the 1200-1800 $cm^{-1}$ wavenumber range, again suggesting perturbation of the C=C, C—H, or the C=O groups as the PR254 reacts with the clay.

Figure 7:
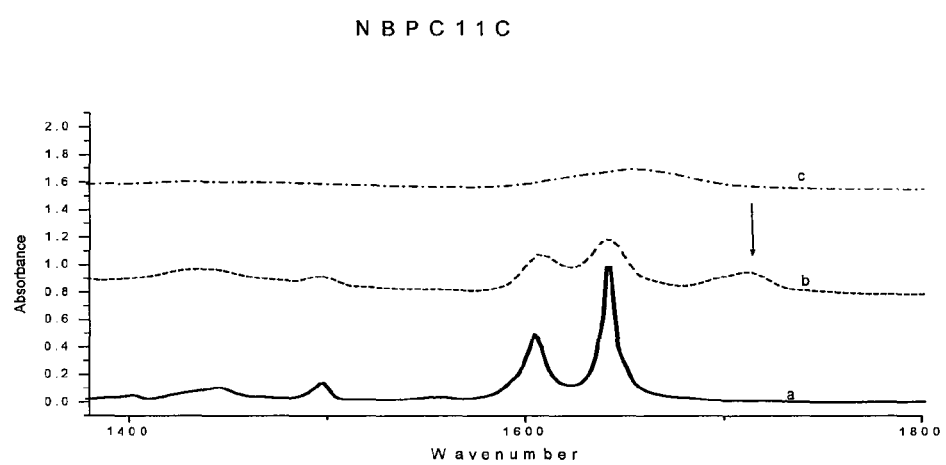
FIG. 7 are Fourier Transform infrared spectra of embodiments according to the present disclosure comprising Pigment Red 254.

FIG. 7 is an expanded graphical image of the wavenumber range that particularly denotes the carbonyl, CO=O peak intensity of the PR254 as it reacts with the clay. In FIG. 7, curve a denotes pure PR254; curve b denotes Sample No. NBPC11C (10 wt. % PR254 reacted with 90 wt. % MAt50 based on the total weight of the pigment and the clay); and curve c denotes MAt50 clay.

The embodiments illustrated in the instant disclosure are for illustrative purposes only. They should not be construed to limit the claims. As is clear to one of ordinary skill in the art, the instant disclosure encompasses a wide variety of embodiments not specifically illustrated herein. While the compositions and methods of this disclosure have been described in terms of exemplary embodiments, it will be apparent to those of skill in the art that variations may be applied to the compositions and methods and in the steps or in the sequence of steps of the method described herein without departing from the concept, spirit and scope of the invention.

What is claimed is:

1. An organic-inorganic hybrid pigment composition comprising an organic pigment, an inorganic pigment, and a fibrous clay.

2. The organic-inorganic hybrid pigment composition of claim 1, wherein the fibrous clay is a palygorskite, sepiolite, or combination thereof.

3. The organic-inorganic hybrid pigment composition of claim 1, wherein the inorganic pigment is selected from the group consisting of rutile pigments, spinel pigments, bismuth vanadate pigments, cerium sulfide pigments, and combinations thereof.

4. The organic-inorganic hybrid pigment composition of claim 3, wherein the inorganic pigment is a rutile-based pigment.

5. The organic-inorganic hybrid pigment composition of claim 4, wherein the rutile-based pigment is chromium antimony titanate yellow or antimony nickel titanate yellow.

6. The organic-inorganic hybrid pigment composition of claim 1, wherein the organic pigment is selected from the group consisting of anthraquinone pigments, anthrathrone pigments, anthrapyrimidine pigments, azo pigments, azomethine pigments, quinacridone pigments, quinophthalone pigments, diketopyrrolopyrrol pigments, inanthrone pigments, isoindoline pigments, metal complex pigments, perinone pigments, perylene pigments, phthalocyanine pigments, pyranthrone pigments, pyrazolo-quinazolone pigments, thioindigo pigments, and combinations thereof.

7. The organic-inorganic hybrid pigment composition of claim 1, further comprising a thermoplastic or thermoset polymer.

8. The organic-inorganic hybrid pigment composition of claim 7, wherein the polymer is a polyamide, polyolefin, polycarbonate, polyester, polysulfone, polyether, or epoxy.

9. The organic-inorganic hybrid pigment composition of claim 1, wherein the composition comprises a total amount of said organic pigment and inorganic pigment in a range of 0.01 wt. % to about 75 wt. % based on the total weight of the hybrid pigment composition.

10. A method of forming an organic-inorganic hybrid pigment composition, comprising: providing an organic-inorganic hybrid pigment and a fibrous clay, and mixing the organic-inorganic hybrid pigment with the fibrous clay.

11. The method of forming an organic-inorganic hybrid pigment composition according to claim 10, further comprising grinding the fibrous clay, and mixing the ground clay with the organic-inorganic hybrid pigment.

12. The method of forming an organic-inorganic hybrid pigment composition according to claim 10, further comprising grinding the organic-inorganic hybrid pigment, and mixing the ground organic-inorganic hybrid pigment with the clay.

13. The method of forming an organic-inorganic hybrid pigment composition according to claim 10, further comprising after mixing the organic-inorganic hybrid pigment with the clay, grinding the hybrid pigment and clay together.

14. The method of forming an organic-inorganic hybrid pigment composition according to claim 10, further comprising heating the fibrous clay and organic-inorganic hybrid pigment to a temperature of about 90° C. to about 400° C. for about 10 minutes to about 24 hours to react the organic-inorganic hybrid pigment with the fibrous clay.

15. The method of forming an organic-inorganic hybrid pigment composition according to claim 14, wherein the fibrous clay and organic-inorganic hybrid pigment are heated to a temperature of about 150° to about 170° C.

16. The method of forming an organic-inorganic hybrid pigment composition according to claim 14, wherein the fibrous clay and organic-inorganic hybrid pigment are heated for about 1 hour to about 9 hours.

17. The method of forming an organic-inorganic hybrid pigment composition according to claim 10, further comprising adding a thermoplastic or thermoset polymer to the composition.

* * * * *